United States Patent [19]
Ota

[11] 3,892,568
[45] July 1, 1975

[54] ELECTROPHORETIC IMAGE REPRODUCTION PROCESS

[75] Inventor: Isao Ota, Osaka, Japan

[73] Assignee: Matsushita Electric Industrial Co., Ltd., Osaka, Japan

[22] Filed: Apr. 17, 1970

[21] Appl. No.: 29,414

[30] Foreign Application Priority Data
Apr. 23, 1969 Japan.............................. 44-31600
June 12, 1969 Japan.............................. 44-46698
June 12, 1969 Japan.............................. 44-46700
Apr. 23, 1969 Japan.............................. 44-31601
June 12, 1969 Japan.............................. 44-46699
June 12, 1969 Japan.............................. 44-46701

[52] U.S. Cl................ 96/1.3; 96/1 PE; 204/180 R; 204/181
[51] Int. Cl........................................... G03g 13/22
[58] Field of Search........... 96/1, 1.3; 204/180, 181, 204/180 R

[56] References Cited
UNITED STATES PATENTS

| 2,898,279 | 8/1959 | Metcalfe et al. | 204/181 |
| 3,145,156 | 8/1964 | Oster | 204/180 |
| 3,200,058 | 8/1965 | Oster | 204/181 |
| 3,288,602 | 11/1966 | Snelling et al. | 96/1 R |
| 3,384,566 | 5/1968 | Clark | 96/1 X |
| 3,488,273 | 1/1970 | Johnson | 204/181 |
| 3,510,419 | 5/1970 | Carreira et al. | 96/1.3 X |
| 3,607,256 | 9/1971 | Silverberg | 96/1 R |

Primary Examiner—Roland E. Martin, Jr.
Attorney, Agent, or Firm—Wenderoth, Lind & Ponack

[57] ABSTRACT

Electrophoretic image reproduction process is disclosed. In this process, a D.C. voltage is uniformly applied across an electrophoretic suspension layer including a dispersion of at least one electrophoretic material in a finely divided powder form suspended in a suspending medium, whereby said D.C. voltage changes the spatial distribution of said electrophoretic material so as to change an optical reflective property of said electrophoretic suspension layer. An electric field in a given image is then applied to said changed suspension layer, whereby said electrophoretic material stricken by said electric field moves electrophoretically and reproduces said given image on said electrophoretic suspension layer.

17 Claims, 15 Drawing Figures

INVENTOR
ISAO OTA

*INVENTOR*
ISAO OTA

1

ELECTROPHORETIC IMAGE REPRODUCTION PROCESS

BACKGROUND OF THE INVENTION

This invention relates to an image reproduction process and particularly to an electrophoretic image reproduction process utilizing the electrophoresis phenomenon in a suspension.

The electrophoresis phenomenon is widely used in electrode positioning of fine particles or development of electrostatic latent images in electrophotography. The prior art, for example, U.S. Pat. Nos. 3,145,156 to Oster, 2,940,847 to Kaprelian, 3,384,588 to Tulagin and Carreira describe methods of producing images by utilizing electrophoresis or photoelectrophoresis. According to these methods in the prior art, a suspension layer is interposed between two electrodes. One of the methods in the prior art comprises applying an input D.C. voltage in a given pattern to said suspension layer between said two electrodes. The other methods in the prior art comprise applying a D.C. voltage between said electrodes, one of which is transparent, while an input light image is projected to said suspension layer through said transparent electrode. In these methods in the prior art, charged particles in said suspension layer are transported to at least one surface of the electrodes or a sheet interposed between the two electrodes so as to reproduce a pattern corresponding to that of input electric field or to an input light image. The reproduced image on the electrode or the sheet can be viewed after separating the two electrodes.

The prior art is not aimed at a variation in the optical reflective property of the suspension layer itself with a change in the spatial distribution of charged particles in the suspension layer and is aimed at a selective transportation of charged particles on the surface of the electrode or the sheet. In other words, prior art relates essentially to the reproduction of permanent visible images but not to a reversible display system.

SUMMARY OF THE INVENTION

An object of this invention is to provide a highcontrast-image display and/or recording process.

Other objects and advantages of this invention will be apparent from the following description, the accompanying drawings and appended claims.

IN THE DRAWINGS:

FIG. 7b is a cross sectional view of the panel of FIG. 7a;

FIG. 8b is a cross sectional view of the panel of FIG. 8a; and

Figure 1A:
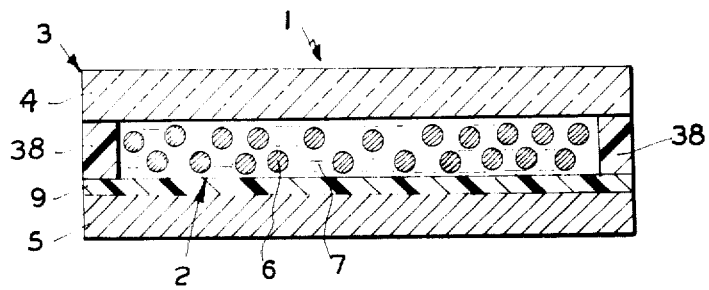
FIGS. 1a–1c are cross sectional views of the image reproduction process for carrying out the steps of this invention.

The size and shapes of the elements of the drawings should not be considered as actual sizes or even proportional to actual sizes because many elements have been purposely distorted in size or shape to more fully and clearly describe the invention.

An electrophoretic image reproduction process according to the present invention comprises uniformly applying a D.C. voltage across an electrophoretic suspension layer including a dispersion of at least one electrophoretic material in a finely divided powder form suspended in a suspending medium, whereby said D.C. voltage changes the optical reflective property of said electrophoretic suspension layer, and then applying an electric field in a given image to said changed electrophoretic suspension layer, whereby said electrophoretic material stricken by said electric fields moves electrophoretically and reproduces said given image on said electrophoretic suspension layer.

Referring to FIGS. 1a–1d, reference character 1 designates, as a whole, an electrophoretic image reproduction sheet which comprises an electrophoretic suspension layer 2 therein. When said suspension layer 2 is in a liquid state, it is enclosed in a housing 3 having a frame 38 and two opposite major housing walls 4 and 5 which are transparent. Said suspension layer 2 has two opposite major surfaces along said two opposite major housing walls 4 and 5 and includes a dispersion of at least one electrophoretic material 6 in a finely divided powder form suspended in a suspending medium 7. The particles of the material 6 are shown greatly enlarged in this and subsequent figures for clarity of illustration. One of said two opposite major housing walls 4 consists of a transparent insulating sheet such as polyester film, cellulose acetate, cellophane or polyethylene. Another of said two opposite major housing walls 5 consists of a transparent insulating sheet as described above or transparent glass plate having a transparent electrode 9 such as cuprous iodine (CuI) or tin oxide ($SnO_2$) attached thereon. Said frame 38 is made up of a plastic sheet having a major center part cut off.

Figure 1B:
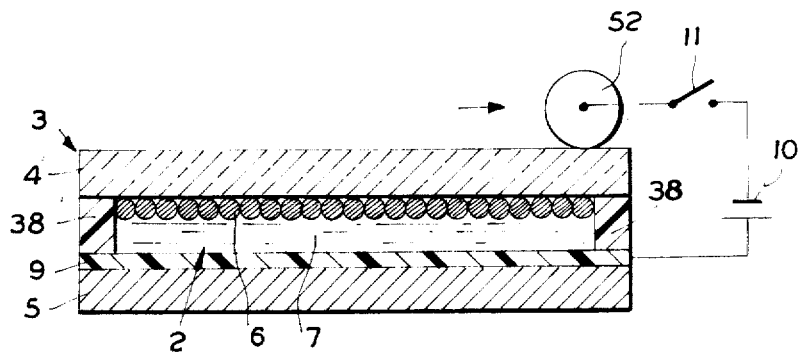
Figure 1C:
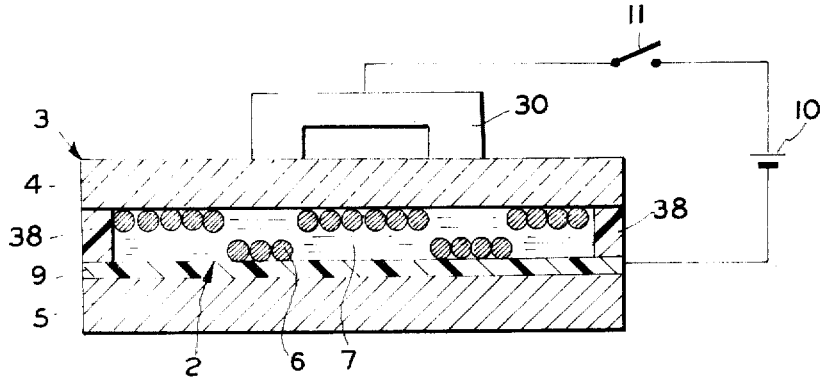
Figure 1D:
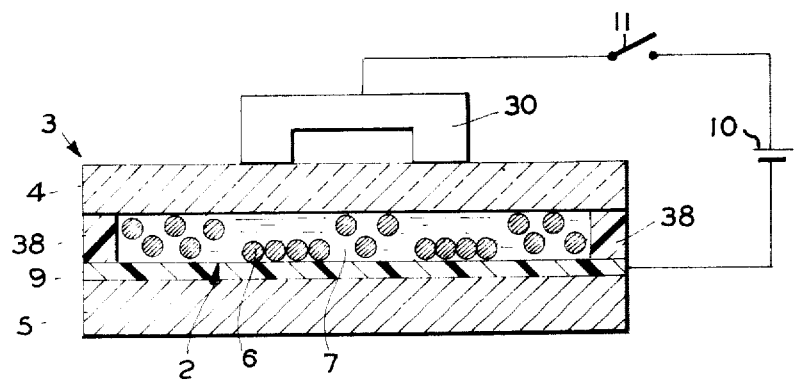
FIG. 1d is a cross sectional view of another image reproduction process.

Before a D.C. electric field is applied to said suspension layer 2, the electrophoretic material 6 in a finely divided powder form is distributed uniformly throughout the suspending medium 7 as shown in FIG. 1a. When the material 6 is, for example, white and the suspending medium 7 is, for example, black, the suspension layer 2 is colored gray, at both sides of housing walls 4 and 5, under the illumination of an incandescent lamp. When a D.C. voltage is applied through a switching device 11 from a D.C. voltage source 10 between a roller electrode 52 and a transparent electrode 9 and said roller electrode 52 is caused to roll on the surface of said insulating housing wall 4 as shown in FIG. 1b, the electrophoretic material 6 moves electrophoretically toward a cathode or an anode depending upon the polarities of said material 6 and applied electric field. When the white material 6 is, for example, positively charged in said black suspending medium 7 and said roller electrode 52 acts as a cathode, the electrophoretic material 6 moves to and is deposited on the inner surface of the housing wall 4 as shown in FIG. 1b. The resultant suspension layer 2 has a different spatial distribution of electrophoretic material 6 and a different optical reflective property from the original gray suspension layer 2 having a uniform distribution of electrophoretic material 6. The electrophoretic image reproduction sheet 1 is white at the housing wall 4 and black at the housing wall 5. The electrophoretic material 6 deposited on the surface of electrode 9 or insulating housing wall 4 by electrophoresis will stay on the surface even after removal of the applied electric field. This means that the electrophoretic image reproduction sheet of the present invention can memorize the optical change of the suspension layer without using further electric power. The changed suspension layer 2 is then subjected to an electric field in a given image by placing, for example, a voltage applied electrode 30 having a given image, on the surface of the housing wall 4 as shown in FIG. 1c. When said electric field in a given image is in reverse polarity to the initial D.C. voltage, only the material 6 stricken selectively by said reverse D.C. electric field in a given image moves electrophoretically to the cathode 9 and has a spatial distribution corresponding to said given image of the electrode 30 as shown in FIG. 1c. When the electrode 30 is removed from the surface of the housing wall 4, reproduced black image on the white background or white image on the black background can be seen at the housing walls 4 or 5, respectively. When the electrophoretic suspension layer 2 having a uniform distribution of electrophoretic material 6 is directly subjected to a D.C. electric field in a given image as shown in FIG. 1d, a black image on the gray background or a white image on the gray background is reproduced at the housing wall 4 or 5, respectively. As is apparent in the foregoing descriptions and figures, in the electrophoretic image reproduction process of the present invention, a D.C. voltage is applied to the electrophoretic suspension layer before an input electric field in a given image is applied to the electrophoretic suspension layer. The application of a D.C. voltage to the electrophoretic suspension layer changes the optical reflective property of the electrophoretic suspension layer and the application of a reverse D.C. electric field in a given image to the changed suspension layer can reproduce the given image of high contrast. When the electrophoretic material 6 is, for example, yellow and the suspending medium 7 is colored, for example, cyan, and the yellow material is uniformly distributed throughout the cyan suspending medium, the suspension layer shows a green mixed color of the yellow material and the cyan suspending medium. Such a suspension layer can reproduce a yellow image on the cyan background or a cyan image on the yellow background on either side of the housing walls 4 and 5 in a manner similar to that described in FIGS. 1b and 1c. The application of an A.C. electric field to the changed suspension layer can effectively recover the uniform distribution of the electrophoretic material in the suspending medium. When an input A.C. electric field in a given image is applied to the changed suspension layer, a gray image on the white or black background or a green image on the yellow or cyan background can be reproduced by using either of the suspension layers as described above. In the electrophoretic image reproduction sheet 1, it is not always necessary that both of aforesaid two opposite major housing walls 4 and 5 are transparent. The housing wall 5 having a transparent electrode 9 can be replaced by an opaque conductive plate such as metal plate which acts as an electrode and housing wall or by an opaque sheet having an electrode attached thereto.

The suspending medium 7 can be prepared so as to have the desired color by dissolving a colored substance such as a dye in a colorless liquid or by suspending electrically neutral colored particles such as dyes or pigments in a colorless liquid. For example, deep blue colored suspending medium can be prepared by dissolving oil black dyes in ethyl acetate or kerosene. Violet, brown or green colored suspending medium can be prepared by dissolving cobalt napthenate, manganese naphthenate or nickel naphthenate in trichlorotrifluoroethane, respectively.

Figure 2:
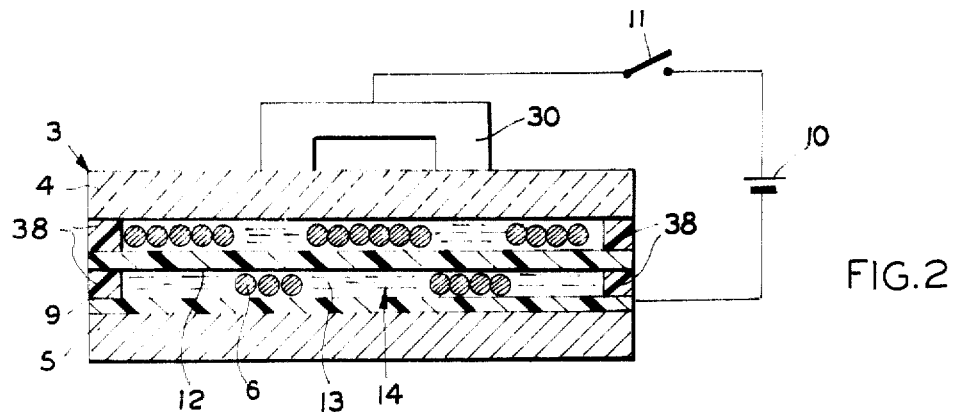
FIGS. 2–5 are cross sectional views of other embodiments of the image reproduction process of this invention.

Referring to FIG. 2 wherein similar reference characters designate components similar to those of FIG. 1, an electrophoretic suspension layer 14 includes a dispersion of at least one electrophoretic material 6 suspended in a colorless suspending medium 13 having a colored porous layer 12 inserted therein and the suspension layer 14 is enclosed in a housing 3. When the roller electrode 52 with an applied D.C. voltage is caused to roll on the surface of the housing wall 4 in a manner similar to that as described in FIG. 1b, the positively charged electrophoretic material 6 is caused to pass through the colored porous layer 12 and is deposited on the inner surface of the housing wall 4. When the layer of the electrophoretic material 6 deposited on the housing wall 4 hides the colored porous layer 12, the image reproduction sheet shows, at the side of the housing wall 4, the same white color of the electrophoretic material 6. When the porous layer 12 is, for example, black and hides the layer of the electrophoretic material 6 deposited on the housing wall 4, the image reproduction sheet shows, at the side of the housing wall 5, the same black color of the colored porous layer 12. When a reverse D.C. electric field in a given image is subjected to said changed electrophoretic suspension layer 14 in a manner similar to that described in FIG. 1c, the electrophoretic material 6 stricken by said reverse D.C. electric field in a given image moves electrophoretically to the cathode 9 and reproduces said given image on said electrophoretic suspension layer as shown in FIG. 2.

It is also possible to use an electrophoretic suspension layer having a colored porous layer inserted in a colored suspending medium and at least one electrophoretic material suspended therein. Colored porous layer 12 in the present invention can be made from any sheet material having pores therein. The size of pores must be large enough to pass the particles of the electrophoretic material therethrough and small enough to hide the electrophoretic material from sight. Operable materials are a cloth or a mesh woven of natural or artificial fibers; a fibroid sheet having thousands of irregular pores; a thin plate with many tiny holes, and a sheet having granular material bound together with resin or adhesive agent to form a large number of pores.

Figure 3:
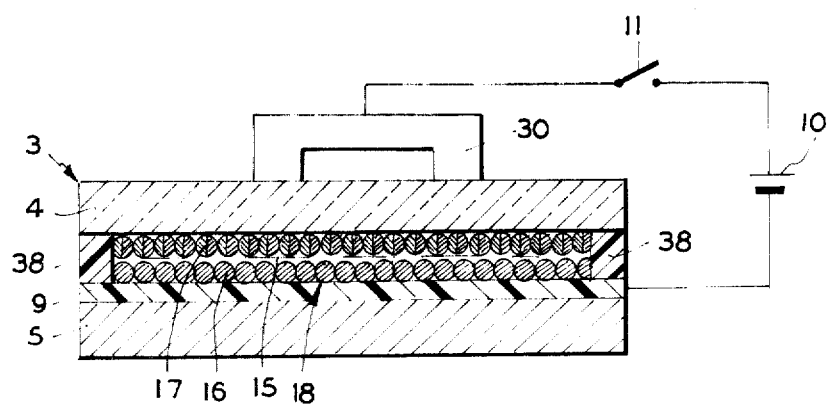

Referring to FIG. 3 wherein smaller reference characters designate components similar to those of foregoing figures, an electrophoretic suspension layer 18 includes a dispersion of at least two kinds of electrophoretic materials 16 and 17 in a finely divided powder form suspended in a suspending medium 15 which is colored or colorless. Said two kinds of electrophoretic materials 16 and 17 are different from each other with respect to their charge polarity and optical reflective property. When a D.C. electric field is applied to the electrophoretic suspension layer 18 in a manner similar to that described in FIG. 1b, said two kinds of electrophoretic materials 16 and 17 are caused to move electrophoretically in directions opposite to each other, whereby one each is deposited on the surface of the electrode 9 and the housing wall 4. When said electrophoretic material 16 his positive polarity and is, for example, yellow and said electrophoretic material 17 has negative polarity and is, for example, cyan, an the electrophoretic image reproduction sheet changes in color. It is yellow at the cathode side and is cyan at the anode side. When a reverse D.C. electric field in a given image is applied to said changed suspension layer 18, electrophoretic materials 16 and 17 stricken by the reverse electric field are caused to move electrophoretically in directions opposite to each other and reverse their positions from the arrangement described in FIG. 3. After removal of the electrode 30 from housing wall 4, a cyan image on the yellow background is seen at the housing wall 4 and a yellow image on the cyan background is seen at the housing wall 5. The reproduced images can be erased by rolling a roller electrode 52 with an applied D.C. or A.C. voltage on the surface of the housing wall 4.

Figure 4:
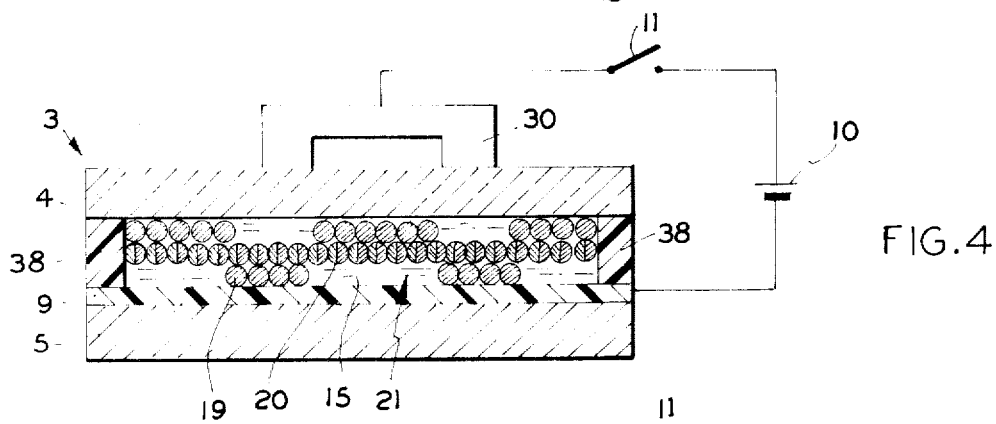

Referring to FIG. 4 wherein similar reference characters designate components similar to those of foregoing figures, an electrophoretic suspension layer 21 includes a dispersion of at least two kinds of electrophoretic materials 19 and 20 in a finely divided powder form suspended in a suspending medium 15. Said two kinds of electrophoretic materials 19 and 20 have the same charge polarity, for example, positive charge polarity, but have different electrophoretic mobilities and optical reflective properties from each other. When said two kinds of electrophoretic materials 19 and 20 are, for example, white and black, respectively, and suspending medium 15 is colorless and the materials 19 and 20 are distributed uniformly throughout the suspending medium 7, the electrophoretic suspension layer 21 is colored gray at both housing walls 4 and 5. When a D.C. voltage is applied to the electrophoretic suspension layer 21 in a manner similar to that described in FIG. 1b, the electrophoretic materials 19 and 20 are caused to move electrophoretically in the same direction. When an electrophoretic mobility of the electrophoretic material 19 is greater than that of the electrophoretic material 20, the electrophoretic material 19 moves faster under the applied D.C. field than does the electrophoretic material 20 in said suspension layer 21. Thus, the amount of the former deposited nearest to the cathode is larger than the amount of the latter. Therefore, electrophoretic suspension layer 21 changes in color and shows a deeper white color at the cathode side and a deeper black color at the anode side than that of the original gray suspension layer having no D.C. electric field applied thereto. When a reverse D.C. electric field in a given image is applied to said changed suspension layer 21 in a manner similar to that described in FIG. 1c. a visible image corresponding to said field image is reproduced on the electrophoretic suspension layer 21 as shown in FIG. 4. The reproduced image has a higher contrast than has an image which is reproduced by applying a D.C. electric field in a given image to an electrophoretic suspension layer 21 having no initial D.C. electric voltage applied thereto.

The reproduced image is erased by applying a D.C. or A.C. electric field to the whole area of said suspension layer 21.

Figure 5:
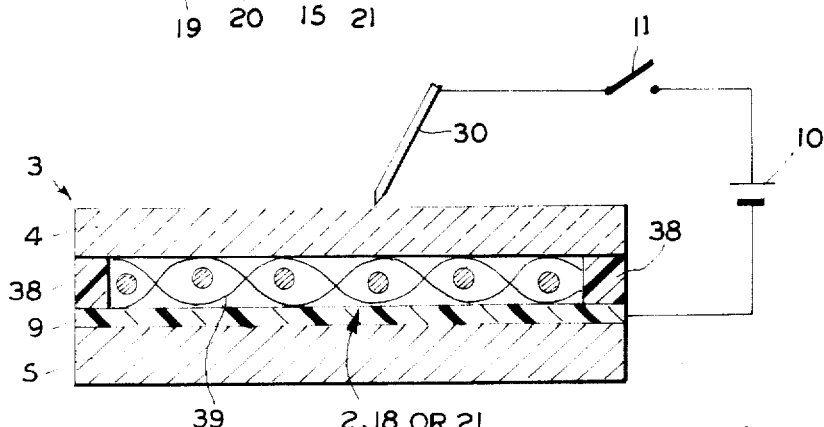

When the suspension layer 2, 14, 18 or 21 in FIGS. 1, 2, 3 or 4 is in viscosity, for example, in a solid state at room temperature, it is possible to remove the housing wall 4 in FIGS. 1–4 and to make the roller electrode 52 or the electrode 30 to be in direct contact with the surface of the suspension layer. The D.C. voltage or the electric field in a given image is applied to the suspension layer while it is in a soft state as described later. Aforesaid suspension layers 2, 14, 18 and 21 in FIGS. 1, 2, 3 and 4 change in color under the influence of an electric field applied thereto. This is because the spatial distribution of the electrophoretic material in the suspension is changed by application of an electric field and a layer of at least one electrophoretic material deposited on the surface of an electrode or a housing wall hides, or is hidden by, the residual colored component in the suspension, such as the colored suspending medium, the colored porous layer or the other electrophoretic material. The electrophoretic image reproduction process of the present invention is aimed at an image reproduction of high contrast and comprises applying a D.C. voltage to said electrophoretic suspension layer so as to change its color and applying a reverse D.C. or A.C. electric field in a given image to the changed suspension layer so as to reproduce said given image on the electrophoretic suspension layer. It is preferred to insert a colorless spacer 39 such as a porous layer or a sheet having a plurality of projections thereon between said two opposite major housing walls 4 and 5 particularly when the walls are flexible as shown in FIG. 5. Said colorless spacer 39 can hold the suspension layer 2, 18 or 21 of FIGS. 1a, 3 or 4 at a given thickness by preventing the housing wall 4 and the electrode 9 from touching each other even when an electrode 30 is pushed on the flexible housing wall 4 or the flexible housing 3 includes an electrophoretic suspension layer in a liquid state and is bent.

When said first electrode 30 is a pen type electrode and moves freely on the surface of the housing wall 4, one can display any desired pattern of high contrast at the housing walls 4 and 5 by writing under application of a second D.C. voltage reverse in polarity to a first D.C. voltage across said pen type electrode 30 and second electrode 9 while moving said pen type electrode 30 in the said desired pattern after the entire area of the suspension layer is subjected to the first D.C. voltage as shown in FIG. 5. Said colorless spacer 39 can be made from any colorless sheet having pores or projections. One appropriate material is a screen of a material such as Tetron or nylon. Tetron is a trade name of polyester fiber in Japan. Colored porous layer 12 in FIG. 2 must be substantially opaque and hide the electrophoretic material, but said colorless spacer 39 need not hide the electrophoretic material and can act as a spacer for holding the suspension layer in a given thickness. Said colorless spacer 39 need only be inserted between two major housing walls, or at least one of the major surfaces of the colorless spacer 39 may be attached to the inner surface of the housing wall 4 or to the electrode 9. In the suspension layer 14 including a colored porous layer 12 as described in FIG. 2, said colorless spacer 39 need not be inserted if the colored porous layer 12 itself can act as a spacer between two major housing walls.

Figure 6A:
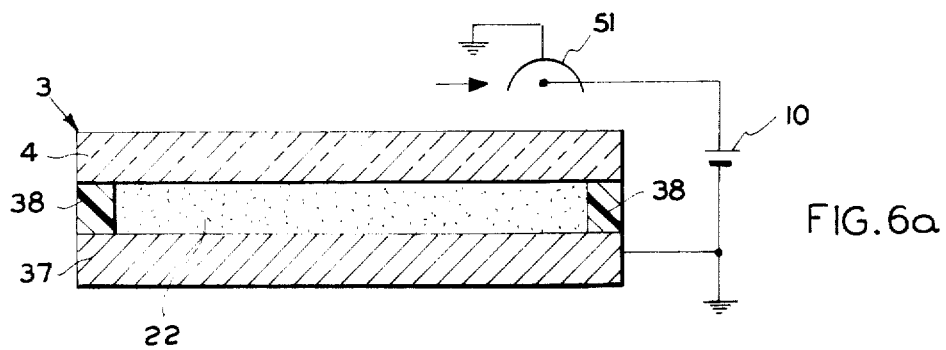
FIGS. 6a and 6b are cross sectional views of the method for applying a D.C. voltage of the electrophoretic suspension layer of this invention.

Referring to FIG. 6 wherein similar reference characters designate components similar to those of foregoing figures, a suspension layer 22 can be made of any possible electrophoretic suspension layer such as a suspension layer 2, 14, 18 or 21 of FIGS. 1, 2, 3 or 4. The suspension layer 22 includes a dispersion of at least one electrophoretic material suspended in a suspending medium and is enclosed in a housing 3. One of the housing walls is made of, for example, metal plate electrode 37. A D.C. voltage is applied to the electrophoretic suspension layer 22 by charging the surface of the housing wall 4 with corona ions produced by a corona discharge means 51 as shown in FIG. 6a. The corona discharge means 51 and the metal electrode 37 are connected to opposite terminals of the high voltage D.C. source 10.

The corona discharge means 51 can be scanned over the housing wall 4 so as to change the color of the suspension layer 22 over the entire surface. After that, a reverse electric field in a given image is applied to the changed suspension layer so as to reproduce the given image, for example, by charging selectively the surface of the housing wall 4 in an image form with reverse charge in a manner similar to that well known in the electrostatic recording art or by placing a reverse voltage applied electrode 30 having a given image, on the outer surface of the housing wall 4 in a similar to that described in FIG. 1c. The reproduced image is erased by charging the whole surface of the housing wall 4 with positive or negative corona ions in a manner similar to that shown in FIG. 6a.

Figure 6B:
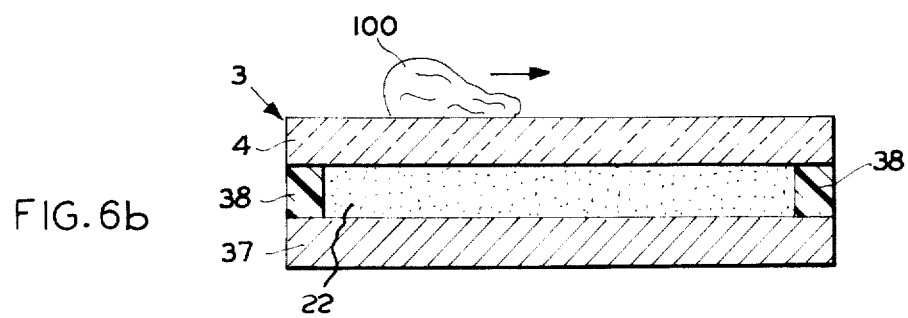

Said D.C. voltage can be applied to the electrophoretic suspension layer 22 by charging the surface of the housing wall 4 triboelectrostatically instead of by using a corono discharge means 51. This can be done by frictionally rubbing the surface of the housing wall 4 with a cloth or brush 100 as shown in FIG. 6b. A visible image of high contrast can be obtained by applying a reverse D.C. electric field in a given image to the changed suspension layer in a manner similar to that described above.

Figure 7A:
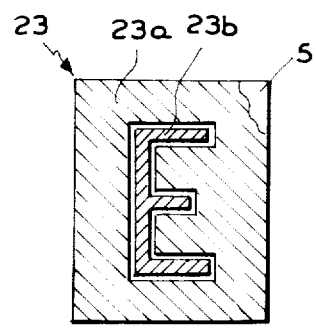
FIG. 7a is a front view of a second electrode for use in a pattern display panel of this invention.
Figure 7B:
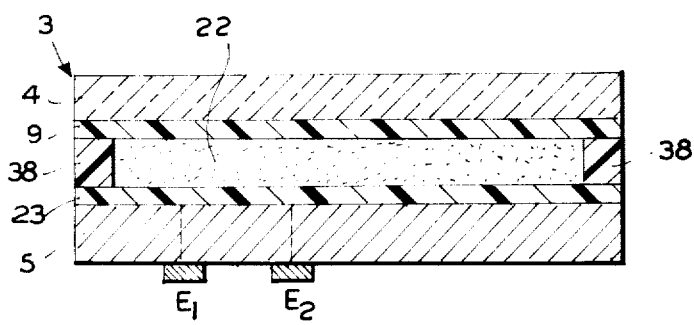

Referring to FIGS. 7a and 7b wherein similar reference characters designate components similar to those of foregoing figures, a housing 3 encloses, for example, a suspension layer 22, similar to that described in FIG. 1a. The housing 3 has two opposite major housing walls 4 and 5, at least one of which is transparent; in the drawing, housing wall 4 is transparent. The inner surfaces of the two housing walls 4 and 5 have a first electrode 9 and a second electrode 23 attached thereto, respectively. A first electrode 9 is transparent and extends uniformly throughout a whole of the transparent housing wall 4. A second electrode 23 consists of, for example, two electrically divided electrodes 23a and 23b and is formed into a given image such as an E shaped image. Said electrodes 23a and 23b have, through leads, electrical terminals $E_1$ and $E_2$ positioned at the outer surface of the housing wall 5. When a D.C. voltage is applied across said first electrode 9 and said second electrode 23 so as to make the electrodes 9 and 23 a cathode and an anode respectively, the color characteristic at the electrode 9 can be white.

Then an electric field in a given image is applied to a changed electrophoretic suspension layer 2 by connecting the electrodes 9 and 23b to the positive and negative terminals of the D.C. voltage source, respectively, whereby the electrophoretic material selectively stricken by said reverse D.C. electric field moves electrophoretically to the electrode 23b. Said given image E is reproduced at the electrode 9. The reproduced image E has high contrast because it has a black color on the image area corresponding to the electrode 23b and a white color on the background area corresponding to the electrode 23a. The reverse high contrast image which has a white color on the image area and a black color on the background area can be reproduced at the electrode 9 by reversing the polarities of applied voltages in the above operation. It is also possible to reproduce the high contrast image on the panel of FIG. 7b by simultaneously or individually keeping the electrode 9 at zero potential and the electrode 23a at positive (or negative) potential and electrode 23b at negative (or positive) potential, respectively. The panel of FIG. 7b can display the given image of high contrast. This is because the electrode 23 includes an electrode 23a which can apply a D.C. voltage to the suspension layer corresponding to the background area of the given image. The displayed image is erased by applying a D.C. or A.C. voltage between the electrode 23 and the electrode 9.

Figure 8A:
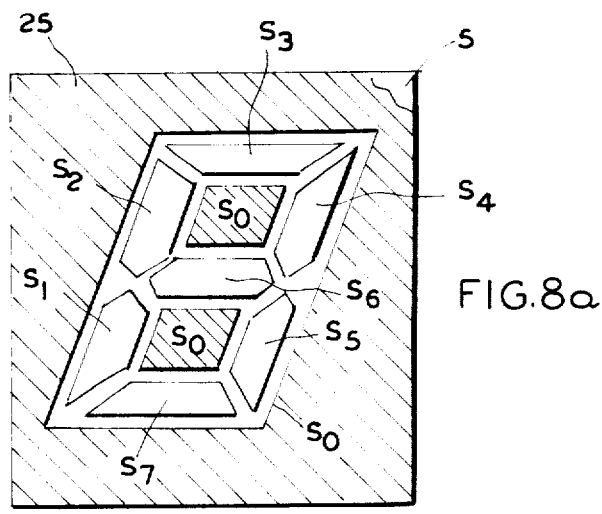
FIG. 8a is a front view of a first electrode for use in a numerical character display panel of this invention.
Figure 8B:
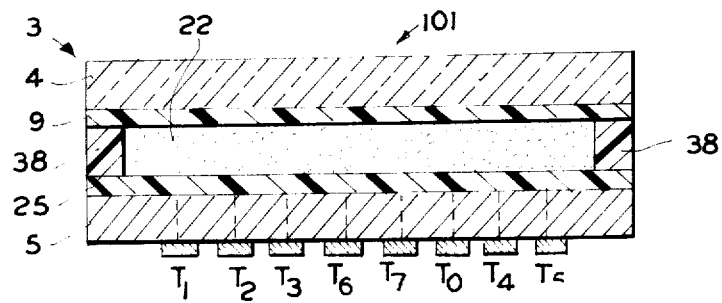

Referring to FIG. 8a and 8b wherein similar reference characters designate components similar to those of foregoing figures, a numerical character display panel 101 has a suspension layer 22 enclosed in a housing 3 having two opposite major housing walls 4 and 5. A first electrode 25 is composed of plural segmental electrodes $S_1$–$S_7$ and a common electrode $S_o$ which are separated from each other. A second electrode 9 is transparent and extends uniformly across the entire transparent housing wall 4. Said plural segmental electrodes $S_1$–$S_7$ and common electrode $S_o$ are connected, through leads, to the electrical terminals $T_1$–$T_7$ and $T_o$ positioned at the outer surface of said housing wall 5 as shown in FIG. 8b.

A D.C. voltage is applied between all of the first electrode 25 (or $S_o$–$S_7$) and the second electrode 9 so as to change the color of the panel 101 at the side of the transparent housing wall 4. When a reverse D.C. voltage is applied between selected segmental electrodes (for example $S_3$, $S_4$, $S_5$, $S_6$ and $S_7$) of said first electrode 25 and the second electrode 9, the panel 101 will display a desired numerical character (3) of high contrast. For example, a white numerical character on the black background or a black numerical character on the white background can be easily displayed by using the aforesaid suitable suspension layer which can change in color of black and white by application of a D.C. electric field. The common electrode $S_o$ can apply a D.C. electric field to the suspension area which is not in contact with the segmental electrodes ($S_1$–$S_7$) and can decide the color of the background of the displayed character. When the first electrode 25 consists of only segmental electrodes ($S_1$–$S_7$) and not said common electrode $S_o$, the displayed character shows a mixed color, for example, a gray color on the background area and has poor contrast. In the character display panel 101 as described in FIG. 8b, one can apply firstly a D.C. electric field in a given image to the suspension layer 22 by applying a D.C. voltage between selected segmental electrodes of the first electrode 25 and the second electrode 9 and thereafter or simultaneously apply a reverse D.C. voltage between the residual electrodes of the first electrode 25 and the second electrode 9 so as to display a character of high contrast. Displayed numerical character can be erased by applying a D.C. or A.C. voltage between said first electrode 25 and said second electrode 9.

Figure 9:
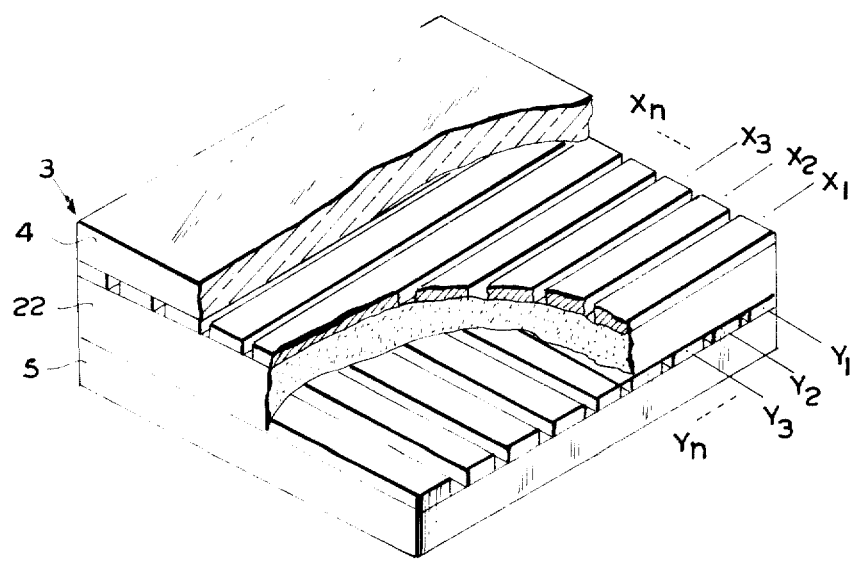
FIG. 9 is a schematic perspective view, as partially broken away, of an image display panel of this invention.

Referring to FIG. 9, wherein similar reference characters designate components similar to those of foregoing figures, a suspension layer 22 consists of any possible electrophoretic suspension such as a suspension layer 2, 14, 18 or 21 of FIGS. 1, 2, 3 or 4.

The suspension layer 22 includes a dispersion of at least one electrophoretic material suspended in a suspending medium and is enclosed in a housing 3 having two opposite major housing walls 4 and 5, at least one of which is transparent; in the drawing the housing wall 4 is transparent.

A first transparent electrode consists of a plurality of strips of electrode materials $x_1, x_2, x_3, \ldots$ which are parallel to each other and which are attached to the inner surface of said transparent housing wall 4. A second electrode is attached to the inner surface of said housing wall 5 and consists of a plurality of strips of electrode material $y_1, y_2, y_3, \ldots$ which are parallel to each other and are orthogonal to said strips of electrode material $x_1, x_2, x_3, \ldots$ A D.C. voltage is applied across the first electrode and the second electrode so as to change the color of the entire area of the suspension layer 22 interposed between both electrodes, and then a reverse D.C. electric field is applied across one electrode selected from among strip electrodes $x_1, x_2, x_3, \ldots$ and one electrode selected from among strip electrodes $y_1, y_2, y_3, \ldots$, for example, across strip electrodes $Y_2$ and $Y_3$. The portion of the suspension layer 22 at the intersection of the two strip electrodes $x_2$ and $y_3$ is actually subjected to a reverse D.C. electric field and forms one picture element which will show a different color from the others.

A selection of more than one strip electrode from among the strip electrodes forming the first and second electrodes produces a desired high contrast image consisting of a plurality of picture elements. Scanning techniques known to the electrical display art can be utilized to scan sequentially and cyclically the picture elements. Displayed image can be erased by simultaneously applying a D.C. or A.C. voltage across all of the first electrode $x_1, x_2, x_3, \ldots$ and all of the second electrode $y_1, y_2, y_3, \ldots$ or by sequentially applying a D.C. or A.C. voltage across two strip electrodes $x_n$ and $Y_n$ so as to scan the picture element to be erased.

Aforesaid electrodes having parts arranged in a given image or being formed of plural segmental or strip electrodes as shown in FIGS. 7a, 8a and 9 can be easily prepared by using any available and suitable method such as electrodeposition, vacuum evaporation, printing or photoetching techniques.

Aforesaid electrophoretic suspension layer can be prepared by using any of well known stable colloidal particles suspended in a suspending medium such as colloidal graphite suspended in mineral oil. In addition to colloidal particles, one can use, as an electrophoretic material, finely divided particles such as titanium dioxide, zinc oxide, lithopone, magnesium oxide, carbon black, black iron oxide, phthalocyanine blue, prussian blue, phthalocyanine green, malachite green lake, hansa yellow, bendizine yellow, cadmium yellow, watchung red or lake red C suspended stably in a suspending medium such as cyclohexane, kerosene, trichlorotrifluoro-ethane, carbontetrachloride, isopropyl alcohol, paraffin liquid or olive oil. An electrophoretic material suspended in a suspending medium usually bears a positive or negative charge depending upon the properties of the electrophoretic material and the suspending medium.

The electrophoretic suspension layer 2 or 14 of FIG. 1 or 2 can consist of only one electrophoretic material with positive or negative polarity suspended in a suspending medium which is colored or includes a colored porous layer therein. The electrophoretic suspension layer 18 or 21 of FIG. 3 or 4 must include at least two kinds of electrophoretic materials suspended in a suspending medium. Those two kinds of electrophoretic materials must have different optical reflective properties and different charge polarities or electrophoretic mobilities. Therefore, in preparing an electrophoretic suspension layer 18 or 21, at least one pair of electrophoretic materials having suitable optical reflective properties and electrophoretic properties must be selectively suspended in a suspending medium.

Average particle sizes of the finely divided particles which will be operable are dependent upon the stability and the hiding power of the resultant electrophoretic suspension, and usually range from $0.1\mu$ to about $50\mu$.

It is preferred to add any suitable and available change control agent, dispersion agent or stabilizing agent to the electrophoretic suspension layer to provide a stable suspension layer and to control the electrophoretic property of the electrophoretic material in accordance with the prior art well known in the colloidal chemistry. In order to control the charge property of finely divided particles suspended in a suspending medium, it is also preferred to use particles coated with resin which is not soluble in, or partially soluble in, the suspending medium. When the coated resin is partially soluble in the suspending medium, it can also act as a fixing agent for a reproduced image.

It is possible to use, as a suspending medium, any available and suitable liquid which is inert to the electrophoretic material, the housing and the electrodes. To produce a reversible display, one can use a suspending medium in a liquid state at room temperature, i.e. from 0°C to 35°C.

For a purpose to produce a permanent display, that is, a hard copy, one can use a suspending medium which is in a solid state at room temperature and in a liquid state above room temperature, i.e. above 35°C. Suspending media which are operable for this purpose are, for example, waxes such as beeswax, vegetable wax, paraffin or synthetic wax. When using such waxes, the device according to the present invention must be treated at a higher temperature than room temperature for the display or recording.

After the electrophoretic suspension layer is subjected to a D.C. electric field and an electric field in a given image at higher temperature to vary electrophoretically the spatial distribution of said electrophoretic material, it is cooled to room temperature, for achievement of a permanent display. If it is desired to erase the permanent display, the suspension layer is subjected to an A.C. or D.C. electric field at higher temperature.

When the suspending medium consists of a thermosetting material which is in a liquid state at room temperature, one can produce a permanent display by heating the suspending medium after the electrophoretic movement of the electrophoretic material.

Thermosetting materials which are operable as suspending media are, for example; drying oils such as linseed oil, soya oil or tung oil. When a suspending medium includes a binder such as polystyrol, vinyl acetate resin or linseed oil which fixes the electrophoretic material in a finely divided powder form, one can obtain a hard copy having a permanently visible image reproduced thereon by evaporating or exhausting the residual suspending medium. The evaporation or exhaustion of the suspending medium can be achieved by, for example, evacuating the housing including electrophoretic material in the suspending medium through an outlet formed, for example, in the housing wall.

The amount of electrophoretic material in a suspending medium or the thickness of the electrophoretic suspension layer is selected, depending upon the hiding power or electrophoretic material, the range of a color change required in the device, feasibility of the voltage source and so on. The value of the hiding power of pigment particles available commercially is helpful in preparing the suspension. For example, the values of the hiding powers of titanium dioxide particles and acetylene black particles are about 130 $cm^2$ and 25400 $cm^2$, respectively, per 1g in usual suspending liquid such as linseed oil. Therefore, and titanium dioxide particles of at least 1g and acetylene black particles of at least 5 mg are required, respectively, so as to change the color of the display panel having an area of 130 $cm^2$ from sufficient black to sufficient white. When the thickness of the suspension layer is to be 1 mm, said amount of each pigment particles must be introduced into 13 ml of a suspending medium.

Since the display device of the present invention is the reflective type, the suspension layer must be opaque in order to make a great color change. The thicker the suspension layer, the higher the applied voltage which is usually required. The thinner the suspension layer, the denser the concentration of the electrophoretic material must be to make a great color change. The thickness of the suspension layer is usually from a few microns to a few mm.

EXAMPLE

A mixture of particles as described in Table 1 is combined with 200 ml of olive oil and well blended in a ball mill to produce a gray paste having white and black particles suspended in olive oil. In this gray paste, titanium dioxide particles are positively charged and black toner particles, negatively charged in the olive oil. A housing is prepared by inserting a Tetron screen (No. 1350 supplied by the Teizin Company in Japan) between a 25$\mu$ thick transparent polyester film sheet and an aluminum plate and by fixing the surrounding region of said three layered sheet by Alaldite adhesion (commercially available from the Ciba Ltd.). Two pin holes (an inlet and an outlet) are prepared on the two corners of said polyester film sheet. Said gray paste is poured into the housing through the inlet. A roller is rolled on the surface of the film sheet so as to form an electrophoretic suspension layer in uniform thickness as shown in FIG. 5. The inlet and the outlet are closed after the housing is filled with said gray paste. The color of the suspension layer viewed through the film sheet is gray under illumination of white light. When a metal roller with an applied negative D.C. voltage of 500 V to the aluminum plate is caused to roll on the film sheet, the color of the suspension layer viewed through the film sheet changes and is white. A pattern electrode having a given character thereon is touched in face to face contact with the surface of the film sheet. A reverse D.C. voltage of 500 V is applied for 1 second across the pattern electrode and the aluminum electrode so as to apply a reverse D.C. electric field in a given image to the changed suspension layer. After removal of the pattern electrode from the film sheet, a black character on the white background is clearly observed through the transparent film sheet. When a metal roller with an applied positive D.C. voltage of 500 V is rolled on the film sheet, the reproduced character is erased and the suspension layer is black. By applying a D.C. voltage of 500 V across the pattern electrode as a cathode and aluminum electrode as an anode, a white character on the black background is reproduced. The reproduced visible character is erased by exposing the film sheet to negative or positive corono discharge as described in FIG. 6a or by frictionally rubbing the surface of the film sheet with a soft cloth as described in FIG. 6b.

TABLE 1

Titanium dioxide particles;
  15 g (a brand R-680 commercially available from the Ishihara Industrial Company in Japan, of rutile type having a particle size 0.15–0.3$\mu$)
Black toner particles
  15 g (Type-10 manufactured for electrophotography by the Rank Xero Company in England)

What is claimed is:

1. An electrophoretic image reproduction process which comprises: uniformly applying a D.C. voltage to an electrophoretic suspension layer, said suspension layer being selected from the group consisting of (1) a suspension including at least one electrophoretic material suspended in a colored suspending medium which is capable of hiding said at least one electrophophoretic materials, (2) a suspension including at least one electrophoretic material suspended in a suspending medium having further a colored material forming a porous layer therein which is porous to said at least one electrophoretic material and is capable of hiding said at least one electrophoretic material, (3) a suspension including at least two electrophoretic materials suspended in a suspending medium, one of said at least two electrophoretic materials differing in charge polarity and color from the other electrophoretic material and being capable of hiding the other electrophoretic material, (4) and a suspension including at least two electrophoretic materials suspended in a suspending medium, one of said at least two electrophoretic materials differing in electrophoretic mobility and color from the other electrophoretic material and being capable of hiding the other electrophoretic material, the average size of said electrophoretic material in each of said suspensions being from 0.1 to 50 microns, whereby said D.C. voltage changes the optical reflective color of said electrophoretic suspension layer; and applying an electric field in a given image to said changed electrophoretic suspension layer, whereby said electrophoretic material struck by said electric field moves electrophoretically in accordance with the direction of said electric field and reproduces said given image on said electrophoretic suspension layer.

2. An electrophoretic image reproduction process defined in claim 1, wherein said suspension layer comprises at least one electrophoretic material suspended in a suspending medium having further a colored material forming a porous layer therein which is porous to said at least one electrophoretic material and is capable of having said at laest one electrophoretic material pass therethrough and of hiding said at least one electrophoretic material.

3. An electrophoretic image reproduction process defined by claim 2, wherein said suspending medium is colored.

4. An electrophoretic image reproduction process defined by claim 2, wherein there are at least two electrophoretic materials, one of which differs in the charge polarity and an optical reflective color from the other.

5. An electrophoretic image reproduction process defined by claim 2, wherein there are at least two electrophoretic materials, one of which differs in electrophoretic mobility and the optical reflective color from the other.

6. An electrophoretic image reproduction process defined by claim 2, wherein said electric field in a given image is a D.C. field in a reverse polarity to that of said D.C. voltage.

7. An electrophoretic image reproduction process defined by claim 2, wherein said electric field in a given image is an A.C. field.

8. An electrophoretic image reproduction process defined by claim 2, wherein said electrophoretic suspension layer is subjected to said D.C. voltage applied between a first electrode and a second electrode, at least one of which is a roller electrode.

9. An electrophoretic image reproduction process defined by claim 1, wherein said electrophoretic suspension layer is enclosed in a housing having two opposite major housing walls at least one of which is transparent.

10. An electrophoretic image reproduction process defined by claim 9, wherein one of said two opposite major housing walls has a first electrode attached thereto, another transparent housing wall has a second transparent electrode attached thereto, at least one of the first electrode and the second electrode consists of plural electrodes.

11. An electrophoretic image reproduction process defined by claim 9, wherein one of said two opposite major housing walls has a first electrode consisting of a plurality of electrically divided electrodes, another of said two opposite major housing walls has a second electrode attached thereto, at least one of said first electrode and said second electrode is transparent and is attached to said transparent housing wall, said D.C. voltage is applied between said first electrode and said second electrode, said electric field in a given image is applied to said electrophoretic suspension layer by applying a voltage in reverse polarity to that of said D.C. voltage between selected electrodes of said first electrode and said second electrode.

12. An electrophoretic image reproduction process defined by claim 9, wherein one of said two opposite major housing walls has a first electrode consisting of a plurality of strips of electrode material which are parallel to each other, and another of said two opposite major housing walls has a second electrode consisting of a plurality of strips of electrode material which are parallel to each other and are orthogonal to said first electrode strips, at least one of said first electrode and said second electrode is transparent and is attached to said transparent housing wall, said D.C. voltage is applied to said electrophoretic suspension layer by applying a D.C. voltage between said first electrode and said second electrode, said electric field in a given image is applied to said suspension layer by applying a reversed D.C. voltage between selected electrodes of said first electrode and selected electrodes of said second electrode.

13. An electrophoretic image reproduction process defined by claim 1, wherein said reproduced image is erased by uniformly applying a D.C. voltage to said electrophoretic suspension layer.

14. An electrophoretic image reproduction process defined by claim 2, wherein said reproduced image is erased by applying an A.C. voltage to said electrophoretic suspension layer.

15. An electrophoretic image reproduction process defined by claim 1, wherein said electrophoretic suspension layer is in a solid state at room temperature but is in a liquid state above room temperature.

16. An electrophoretic image reproduction process defined by claim 1, wherein said electrophoretic suspension layer is in a solid state at room temperature but can become soft enough for electrophoretic movement of said electrophoretic material, by application of solvent thereto.

17. An electrophoretic image reproduction process defined by claim 1 wherein said suspending medium is heat hardenable.

* * * * *